3,085,930
NEMATOCIDES
John Theodore Braunholtz and Frederick Charles Peacock, Bracknell, England, assignors to Imperial Chemical Industries Limited, London, England, a corporation of Great Britain
No Drawing. Filed Feb. 8, 1961, Ser. No. 87,748
Claims priority, application Great Britain Feb. 11, 1960
16 Claims. (Cl. 167—30)

This invention relates to nematocidal compositions and to new compounds having nematocidal properties.

The invention provides nematocidal compositions comprising as active ingredient a compound of the formula:

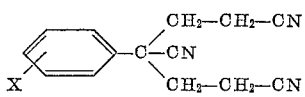

where X is a hydrogen atom, a halogen atom, an alkyl radical having 1–4 carbon atoms (for example a methyl radical) or a cyano group, and a carrier for the said active ingredient.

Compositions which have been found to be of particular interest because of their nematocidal activity are those in which the group X of the active ingredient is a hydrogen atom or an electron-withdrawing substituent, for example a chlorine, bromine or fluorine atom, or a cyano or nitro group. Particularly active compounds are 1:3:5-tricyano-3-phenylpentane, 1:3:5-tricyano-3-(3'-chlorophenyl)-pentane and 1:3:5-tricyano-3(3'-bromophenyl) pentane.

Some of the compositions of this invention are of particular interest in that they have been found to be effective in controlling the root-knot eelworm *Meloidogyne incognita* on tomato plants when applied in the form of an aqueous spray composition to the foliage of the plants. Such compositions, are those set out in Table 2 of this specification.

The carrier used in the compositions of this invention is conveniently an inert diluent. Where the nematocidal composition is to be applied without dilution to growing plants the carrier should be non-phytotoxic. Where the nematocidal compositions are liquid compositions the carrier is conveniently water in view of its cheapness and general availablity. However, the active ingredients of this invention are in general relatively insoluble in water and therefore it is preferable where water is used as the carrier to use the compositions in the form of an aqueous dispersion, for example as an emulsion. The active ingredient can, for instance, be dissolved in a small amount of a suitable organic solvent to give a concentrated solution which can subsequently be mixed with water to provide an aqueous emulsion. The term "carrier" used in this specification is to be interpreted as including organic solvents, especially spray organic solvents. The term "spray organic solvent" as used in this specification means a cheap, relatively non-phytotoxic, commercial organic solvent commonly accepted as being suitable for use as a solvent or dispersion medium in liquid compositions of agricultural chemicals used for spraying the foliage of growing crops. Examples of spray organic solvents are solvent naphtha, kerosene, and chlorinated aromatic hydrocarbons, for example trichlorobenzenes. Provided that the organic solution is to be diluted before use to such an extent that the resulting diluted product is non-phytotoxic, the organic solvent used as carrier need not itself be non-phytotoxic. The nematocidal compositions can be in the form of concentrated dispersions of the active ingredient in water or other liquid medium, for subsequent dilution, for example with water.

The nematocidal compositions of this invention, whether liquid or solid, can obtain, if desired, a suitable wetting or dispersing agent, or other suitable auxiliary agent, useful in nematocidal compositions.

The concentration of active ingredients in nematocidal compositions of this invention suitable for use as foliage sprays can be between wide limits, for example from 50,000 parts per million (p.p.m.) to 500 p.p.m. For use as a soil nematocide, the concentration of active ingredient in the composition is preferably such that the active ingredient can be conveniently applied to the soil in an amount between 5 and 200 p.p.m. of the soil.

The concentration chosen for the composition naturally depends to a large extend upon the activity of the active ingredient towards the nematode to be controlled, the species of plant and the nature of the formulation containing the active ingredient. Concentrated nematocidal compositions for subsequent dilution before use, for instance concentrated solutions, dispersions or pastes can contain, for example, an amount of active ingredient varying from 5% to 50% by weight.

A number of the compounds useful as active ingredients in the compositions of this invention are new compounds which have not hitherto been disclosed. The present invention accordingly includes compounds of the formula:

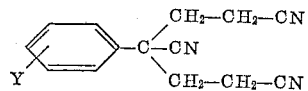

where Y is a cyano group or a fluorine atom.

The invention further includes a process for the preparation of the compounds of the invention in which a substituted benzyl cyanide of formula:

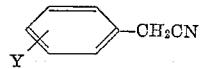

where Y is a cyano group or a fluorine atom, is reacted with acrylonitrile. In general the process can be performed, without the application of heat by mixing the substituted benzyl cyanide and acrylonitrile together preferably in the presence of a strong alkaline substance as catalyst. Suitable alkaline substances include benzyltrimethylammonium hydroxide and a saturated solution of potassium hydroxide in methanol.

A further aspect of the present invention is a process for the destruction, prevention or control of nematodes, especially root-knot eelworms, in which the plant to be protected against the nematodes or the soil in which the plant is growing or is to be grown, is treated with a nematocidal composition or a compound of the invention.

The term "plant" as used in this specification extends to propagative material in general and includes for instance, seeds, bulbs and corms. The term "soil" as used in this specification includes earth, mould, compost and other substrates in which plants susceptible to attack by nematodes can be grown.

The invention is illustrated by the following examples in which unless otherwise stated the parts referred to are parts by weight.

EXAMPLE 1

This example describes the preparation of 1:3:5-tricyano-3(3'-cyanophenyl)pentane.

Acrylonitrile (1.1 parts) was added as drops to a stirred solution of m-cyanobenzyl cyanide (1.4 parts) in dioxan (10 parts) containing Triton B (40% aqueous benzyltrimethylammonium hydroxide) (0.8 part), the temperature being kept below 40° C. by external cooling when required. After stirring the reaction mixture at room temperature for a further 1½ hours, it was poured into ethanol (35 parts); and on addition of water an oil separated which ultimately solidified. Recrystallisation from ethanol of the solid thus obtained gave 1:3:5-tricyano-3(3'-cyanophenyl)pentane as a colourless solid, M.P. 113–116° C.

EXAMPLE 2

This example describes the preparation of 1:3:5-tricyano-3-(4'-cyanophenyl) pentane.

Example 1 was repeated but using p-cyanobenzyl cyanide instead of the meta isomer. The product obtained was 1:3.5-tricyano-3-(4'-cyanophenyl) pentane which was recrystallised from ethanol as a colourless solid, M.P. 131–2° C.

EXAMPLES 3–8

A number of further derivatives of 1:3:5-tricyano-3-phenyl pentane have been prepared by the general method described in Example 1 above, but using the appropriate substituted benzyl cyanide in each instance instead of the m-cyanobenzyl cyanide used in Example 1. These further derivatives, which are set out below in Table 1 as Examples 3–8, are all believed to have a structure according to the general formula:

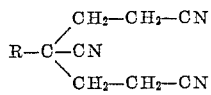

where R is a substituted phenyl radical, and are referred to in Table 1 with reference to the above general formula by showing the nature of the group R of that formula.

*Table 1*

| Example No. | R | Melting point (° C.) |
|---|---|---|
| 3 | 2'-bromophenyl | oil |
| 4 | 2'-methylphenyl | oil |
| 5 | 2'-nitrophenyl | 130-2 |
| 6 | 3'-nitrophenyl | 164 |
| 7 | 4'-fluorophenyl | 108-9 |
| 8 | 3'-fluorophenyl | 80 |

EXAMPLE 9

This example describes aqueous compositions containing as active ingredient 1:3:5-tricyano-3-phenylpentane and suitable for use as foliage sprays against root-knot eelworm infesting tomato plants.

Three aqueous nematocidal compositions containing respectively 10,000, 5,000 and 2,500 p.p.m. of 1:3:5-tricyano-3-phenylpentane as active ingredient were prepared by dissolving respectively 0.2, 0.1 and 0.05 gram of the active ingredient in 1 cc. of benzene containing 5% by weight of an emulsifying agent and mixing the resulting solution with sufficient water to give an emulsion of 20 cc. volume.

EXAMPLES 10–15

Further aqueous nematocidal compositions containing as active ingredient substituted 1:3:5-tricyano-3-phenylpentanes were prepared by the method described in Example 9 in relation to 1:3:5-tricyano-3-phenyl pentane, except that in some instances ethylene dichloride was used instead of benzene as solvent for the active ingredient, and in some instances no compositions having a concentration of 10,000 p.p.m. was prepared. Details of these further compositions are set out below in Table 2.

*Table 2*

| Example No. | Active Ingredient | Solvent |
|---|---|---|
| 10 | 1:3:5-tricyano 3(3'-chlorophenyl)pentane | benzene. |
| 11 | 1:3:5-tricyano 3(4'-chlorophenyl)pentane | Do. |
| 12 | (The product of Example 2) | Do. |
| 13 | do | ethylene dichloride. |
| 14 | (The product of Example 1) | Do. |
| 15 | 1:3:5-tricyano 3(2'-chlorophenyl) pentane | benzene. |

The aqueous compositions of Examples 9–15 were each tested for nematocidal activity as follows: Each of the compositions was sprayed by means of a hand-controlled spray gun on to the upper and lower leaf surfaces of three potted tomato plants standing on a revolving turntable. The spray was delivered under a pressure of 25-lb./sq. in. at a distance of 3 feet from the leaves being sprayed, the pots containing the tomato plants being covered to prevent any of the spray falling on to the soil in the pots. 3 days after spraying, the soil around the roots in the pots was inoculated with a suspension of 24-hour-old root-knot eelworm larvae *Meloidogyne incognita* so as to introduce between 500 and 600 larvae into each of the pots. Fourteen days after this inoculation the roots of each of the three tomato plants were washed free from soil and the number of knots carried by the roots of these plants was noted. The results obtained are set out in Table 3 below in which the root-knot grading numbers refer to the number of knots counted on the roots of the sprayed plants compared with the number on the roots of unsprayed control plants, and have the following meanings:

1—Knots as numerous, or more so than control
2—Some reduction compared with control
3—Reduced to 25–50% of control
4—Few knots for size of root
5—No knots Table 4 illustrates the general condition of the sprayed plants compared with the control plants at the time the roots were inspected to assess the root knots. The root grading numbers in Table 4 have the following meanings:

1—Plant dead
2—Plant alive but root growth negligible
3—Root growth poor to moderate
4—Root growth good though plant showing slight phytotoxic symptoms
5—Plant conditions as good as, or better than, control plants.

In Tables 3 and 4 the letters A, B, and C refer respectively to concentrations of 10,000, 5,000 and 2,500 p.p.m. of active ingredient; and the active ingredients of the compositions tested are indicated by the substituents in the phenyl group of the molecule.

Table 3
INCIDENCE OF ROOT-KNOTS

| Composition of Example No. | Concentration | No. of Replicates | Number of plants having root-knot grading Nos. | | | | |
|---|---|---|---|---|---|---|---|
| | | | 5 | 4 | 3 | 2 | 1 |
| 9 (phenyl) | A | 3 | 3 | | | | |
| | B | 3 | 2 | 1 | | | |
| | C | 3 | 1 | 2 | | | |
| 10 (3'-chlorophenyl) | A | 6 | 4 | 2 | | | |
| | B | 6 | 6 | | | | |
| | C | 6 | 5 | 1 | | | |
| 11 (4'-chlorophenyl) | A | 6 | 4 | 2 | | | |
| | B | 6 | 6 | | | | |
| | C | 6 | | 6 | | | |
| 12 (4'-cyanophenyl) | A | 3 | 3 | | | | |
| | B | 3 | | | 3 | | |
| | C | 3 | | 1 | 2 | | |
| 13 (4'-cyanophenyl) | B | 2 | | 2 | | | |
| | C | 2 | | 2 | | | |
| 14 (3'-cyanophenyl) | A | 2 | | 2 | | | |
| | B | 2 | | 1 | 1 | | |
| | C | 2 | | | 2 | | |
| 15 (2'-chlorophenyl) | A | 2 | 1 | 1 | | | |
| | B | 2 | 1 | 1 | | | |
| | C | 2 | | 1 | 1 | | |

Table 4
CONDITION OF ROOTS

| Composition of Example No. | Concentration | No. of Replicates | Number of plants having root grading Nos. | | | | |
|---|---|---|---|---|---|---|---|
| | | | 5 | 4 | 3 | 2 | 1 |
| 9 (phenyl) | A | 3 | 3 | | | | |
| | B | 3 | 3 | | | | |
| | C | 3 | 3 | | | | |
| 10 (3'-chlorophenyl) | A | 6 | 6 | | | | |
| | B | 6 | 6 | | | | |
| | C | 6 | 6 | | | | |
| 11 (4'-chlorophenyl) | A | 6 | 6 | | | | |
| | B | 6 | 6 | | | | |
| | C | 6 | 6 | | | | |
| 12 (4'-cyanophenyl) | A | 3 | 3 | | | | |
| | B | 3 | 3 | | | | |
| | C | 3 | 3 | | | | |
| 13 (4'-cyanophenyl) | B | 2 | 2 | | | | |
| | C | 2 | 2 | | | | |
| 14 (3'-cyanophenyl) | A | 2 | | 2 | | | |
| | B | 2 | | 1 | 1 | | |
| | C | 2 | | 2 | | | |
| 15 (2'-chlorophenyl) | A | 2 | 1 | 1 | | | |
| | B | 2 | 2 | | | | |

A number of nematocidal compositions of this invention have been tested by being applied in the form of aqueous compositions to the soil surrounding growing tomato plants. Each of the compounds tested was first formulated as an aqueous composition by dissolving 0.1 gram of the compound in a small quantity of a nonphytotoxic organic solvent such as acetone or diacetonyl alcohol and mixing the resulting solution in about 75 cc. of water. The organic solution used was one containing 5% by weight of an emulsifying agent.

Similar aqueous compositions of each compound were made as described above, but using respectively 0.05 gram and 0.025 gram instead of 0.1 gram of the compound. Each of the aqueous compositions were then tested as follows:

Young tomato plants were transplanted into pots containing soil severely infected with root-knot eelworm, *Meloidogyne incognita* the total weight of soil in each pot being 500 grams. Each of the 75 cc. aqueous compositions was then poured on to the soil surrounding a transplanted tomato plant. The whole test was carried out in duplicate.

As a control, two of the transplanted tomato plants were each watered with an aqueous composition similar to those described above, but containing no 1:3:5-tricyano-3-phenylpentane compound as active ingredient.

22 days after the aqueous compositions had been applied to the pots, the tomato plants were lifted, their roots washed free from soil and the number of knots carried by the roots of each plant were counted. The results obtained are set out below in Tables 5, 6 and 7 in which is shown the mean number of knots per plant—figures which have been obtained by halving the total number of knots found on each pair of replicate plants treated with any one aqueous composition.

The results are set out in three separate tables so that they can be directly compared with the control used in assessing their activity.

Table 5

| Compound | Product of Example No. | Mean number of knots per plant | | |
|---|---|---|---|---|
| Control | | 1,442.5 | | |
| | | 50 p.p.m. | 100 p.p.m. | 200 p.p.m. |
| 3'-bromophenyl | | 0 | 0 | 0 |
| 3'-fluorophenyl | 8 | 13.0 | 0 | 0 |
| 4'-fluorophenyl | 7 | 85.5 | 0 | Not tested |
| 2'-methylphenyl | 4 | 1.0 | 0 | 0 |
| 4'-methylphenyl | | Not tested | 126.0 | 17.5 |

Table 6

| Compound | Mean number of knots per plant | | |
|---|---|---|---|
| Control | 862 | | |
| | 50 p.p.m. | 100 p.p.m. | 200 p.p.m. |
| 3'-chlorophenyl | 0 | 0 | 0 |
| 2'-chlorophenyl | 25.0 | 1.5 | 0 |
| 4'-nitrophenyl | 287.0 | 134.5 | 132.5 |

Table 7

| Compound | Mean number of knots per plant | | |
|---|---|---|---|
| Control | 2,020.5 | | |
| | 50 p.p.m. | 100 p.p.m. | 200 p.p.m. |
| 4'-bromophenyl | 25.5 | 0 | 0 |
| 3'-methylphenyl | 202.0 | 127.0 | 23.0 |

What we claim is:

1. Nematocidal compositions comprising as active ingredient a compound of the formula:

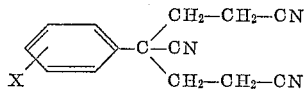

where X is a substituent selected from the group consisting of hydrogen, halogen, alkyl of from 1 to 4 carbon atoms, cyano and nitro, said composition also including a member of the group consisting of wetting agents and dispersing agents, and a carrier for the said active ingredient.

2. Compositions according to claim 1, in which the compound is 1:3:5-tricyano-3-phenylpentane.

3. Compositions according to claim 1, in which the substituent is a cyano group.

4. Compositions according to claim 1, in which the substituent is a nitro group.

5. Compositions according to claim 1, in which the substituent is a methyl radical.

6. Nematocidal compositions according to claim 1 containing as active ingredient 1:3:5-tricyano-3(3'-chlorophenyl) pentane.

7. Nematocidal compositions according to claim 1 containing as active ingredient 1:3:5-tricyano-3-(3'-bromophenyl) pentane.

8. Compositions according to claim 1, in which the carrier is water.

9. Compositions according to claim 1, in which the carrier is a spray organic solvent.

10. Compositions according to claim 1, in which the carrier is water and the active ingredient is in solution in an organic solvent which is dispersed in the water.

11. Compositions according to claim 1, in which the carrier is an inert powder diluent.

12. Compositions according to claim 1, in which the substituent is a halogen atom.

13. Compositions according to claim 12, in which the substituent is a chlorine atom.

14. A process for protecting plants against nematodes which comprise treating a situs normally affected by nematodes with a compound of the formula:

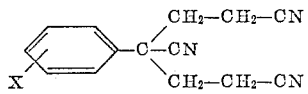

where X is a substituent selected from the group consisting of hydrogen, halogen, alkyl of from 1 to 4 carbon atoms, cyano and nitro.

15. The method of controlling the root-knot eelworm *Meloidogyne incognita* on tomato plants which comprises applying an aqueous spray containing a compound of the formula:

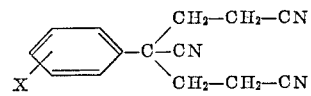

where X is a substituent selected from the group consisting of hydrogen, halogen, alkyl of from 1 to 4 carbon atoms, cyano and nitro to the foliage of the plants.

16. The method of protecting growing plants against nematodes which comprises applying to the soil a compound of the formula:

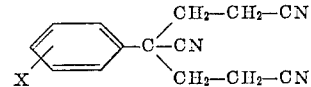

where X is a substituent selected from the group consisting of hydrogen, halogen, alkyl of from 1 to 4 carbon atoms, cyano and nitro, said compound being applied in an amount between 5 and 200 p.p.m. of soil.

References Cited in the file of this patent
UNITED STATES PATENTS
2,305,529    Hestes _____ Dec. 15, 1942